D. K. ALLISON & B. D. PINKNEY.
MECHANICAL MOVEMENT FOR CRACKER CUTTING MACHINES.
APPLICATION FILED FEB. 9, 1914.

1,165,378. Patented Dec. 28, 1915.
3 SHEETS—SHEET 1.

Witnesses
F. A. Hassmann.
Wm. Hust.

Inventors
Daniel K. Allison
Bryant D. Pinkney

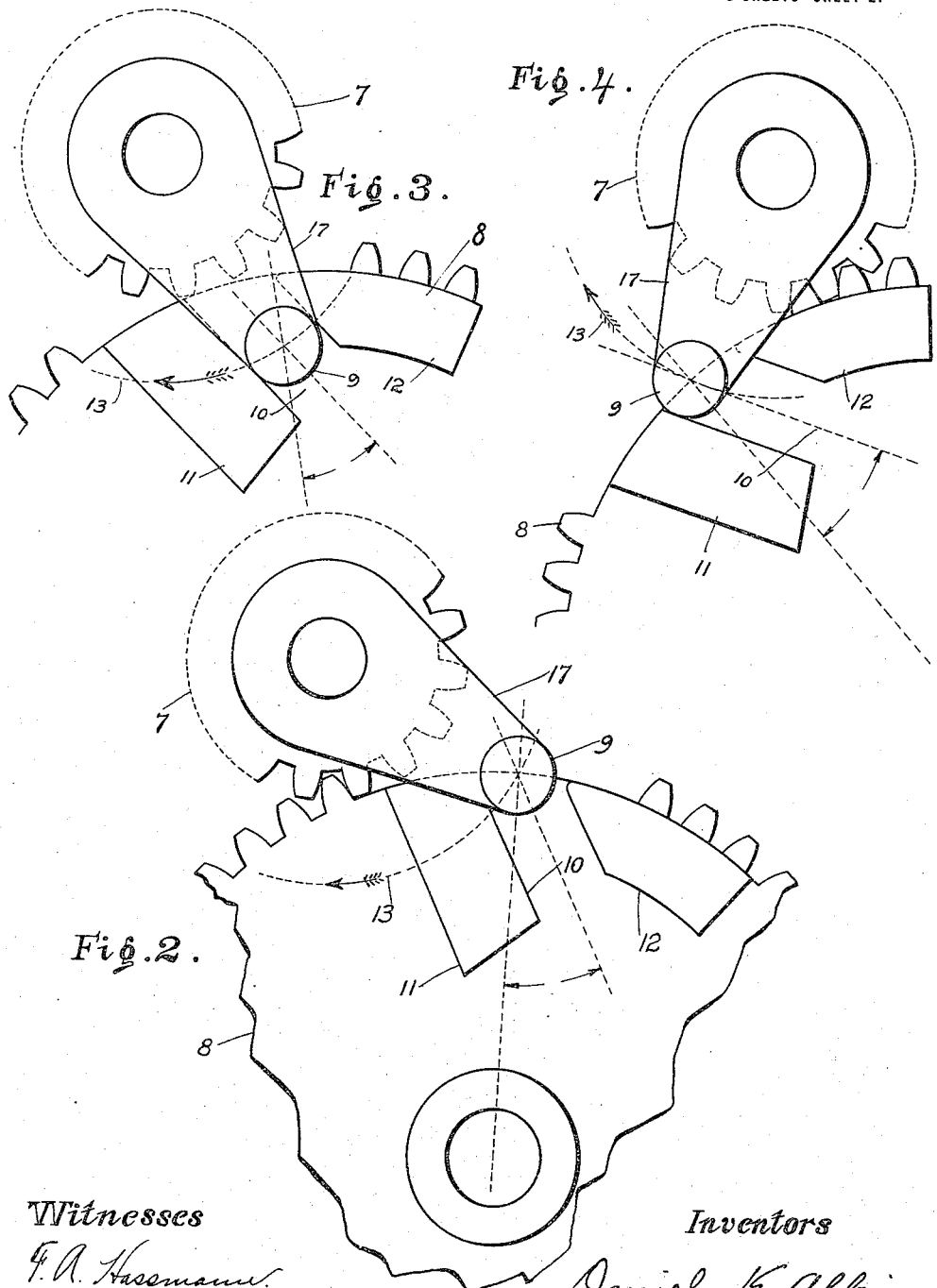

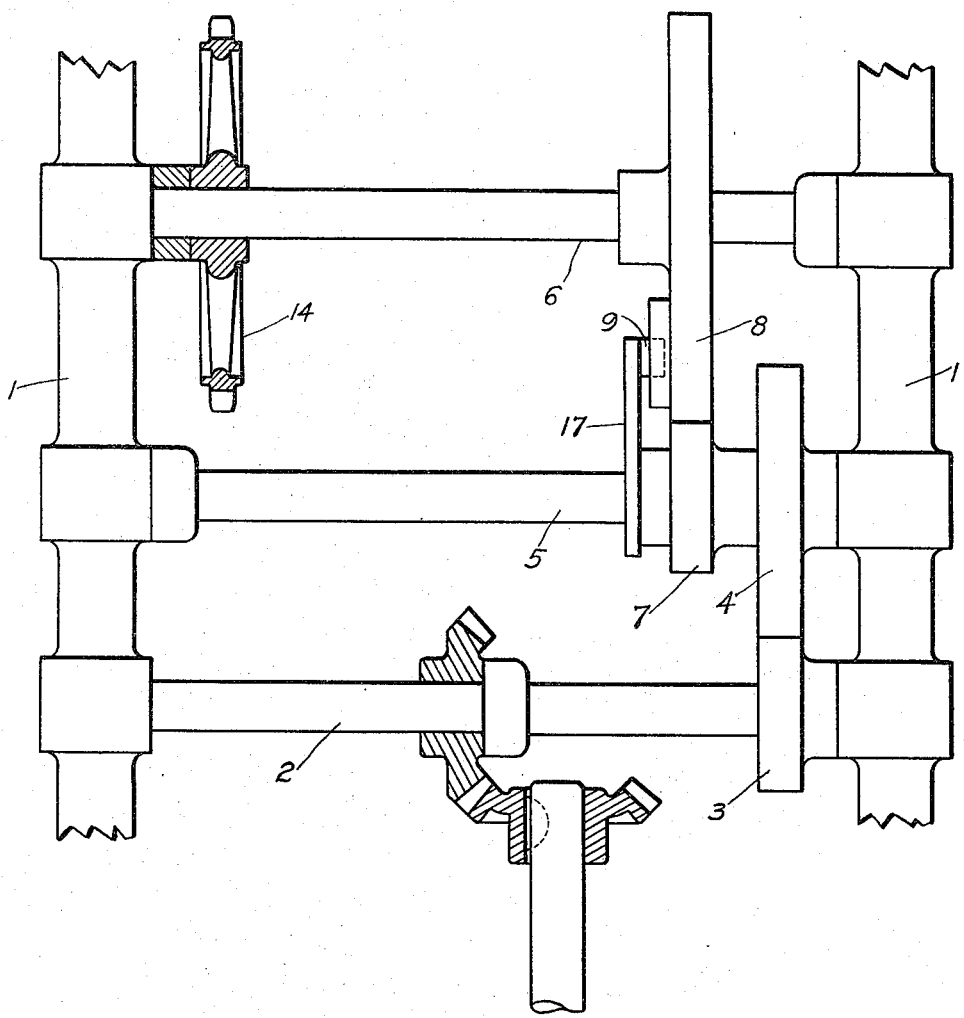

UNITED STATES PATENT OFFICE.

DANIEL K. ALLISON, OF CINCINNATI, OHIO, AND BRYAN D. PINKNEY, OF NEWPORT, KENTUCKY, ASSIGNORS TO THE J. H. DAY COMPANY, OF CINCINNATI, OHIO, A CORPORATION OF OHIO.

MECHANICAL MOVEMENT FOR CRACKER-CUTTING MACHINES.

1,165,378.     Specification of Letters Patent.     Patented Dec. 28, 1915.

Original application filed August 3, 1912, Serial No. 713,029. Divided and this application filed February 9, 1914. Serial No. 817,420.

*To all whom it may concern:*

Be it known that we, DANIEL K. ALLISON, residing at Cincinnati, in the county of Hamilton and State of Ohio, and BRYAN D. PINKNEY, residing at Newport, in the county of Campbell and State of Kentucky, citizens of the United States, have invented a certain new and useful Mechanical Movement for Cracker-Cutting Machines, of which the following is a specification.

Our invention relates to that type of mechanical movements which are applicable to pan skips of cracker cutting machines and its object is to provide a mechanical movement which will be positive in its operation and which will, when applied to pan delivering conveyers of a cracker cutting machine, cause them to skip in proper register with coöperating parts thereof.

Our present invention is a division of our application for an improvement in cracker cutting machines, Serial No. 713,029 filed Aug. 3, 1912.

Figure 1:
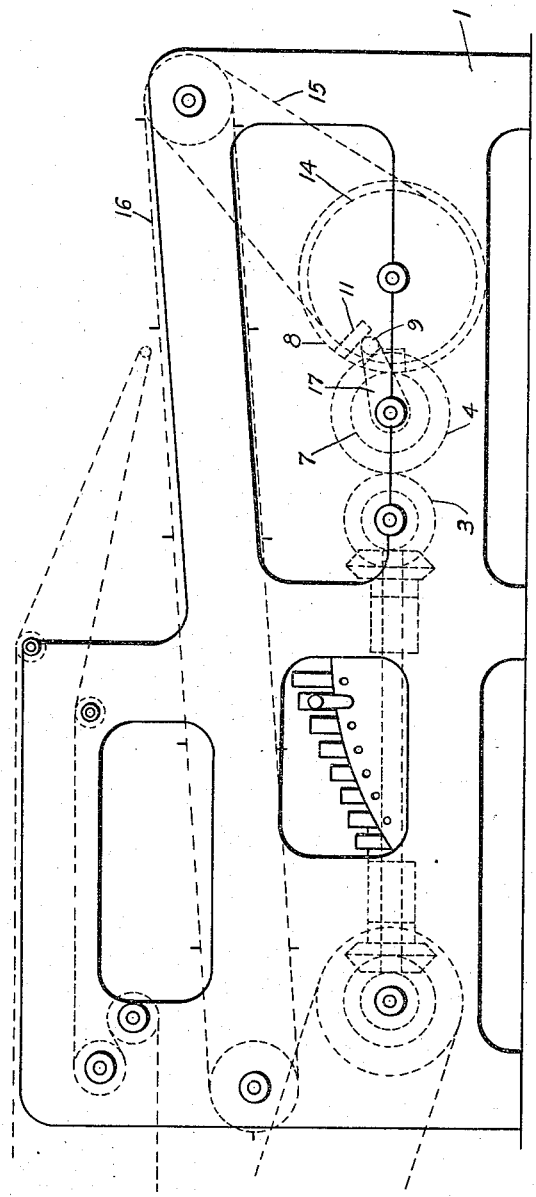
Figure 6:
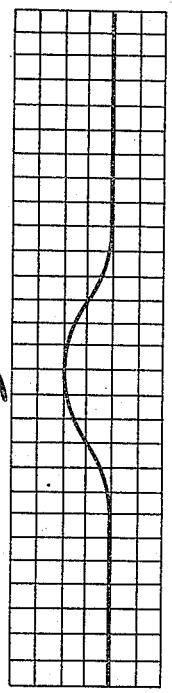

In the accompanying drawings Figure 1 is a side elevation of a portion of a cracker cutting machine; Fig. 2 is a partial view of gears 7 and 8 showing the pan skipping device; Fig. 3 shows similar parts to Fig. 2; Fig. 4 also shows similar parts to Figs. 2 and 3; Fig. 5 is a plan view of our machine. Fig. 6 shows a velocity curve referred to in connection with the pan skip mechanism.

The machine is mounted within the side frame 1—1. The transverse shaft 2 is journaled in the side frames and has keyed thereto the gear pinion 3 which meshes into and drives gear 4, which, in turn, is keyed to shaft 5. Said transverse shaft 5 is also journaled in said side frames 1—1. Transverse shaft 6 is also journaled in said side frames 1—1. The pinion 7 is keyed to shaft 5 and drives gear 8 which is keyed to shaft 6. By reference to Figs. 2, 3, and 4 the operation of pinion 7 and gear 8 may be clearly set forth. During its normal action the gear teeth of the two gears will intermesh but part of the teeth of the gear 8 are cut away, as shown in said figures. The pinion 7 drives gear 8 and when the last tooth is engaging as shown in Fig. 2, the roller 9 is beginning to enter the cam race 10 which is formed by the cam plates 11 and 12 which are fastened to the side of the said gear 8. Roller 9 is mounted on and carried by the rotating arm 17, which is secured to and rotates with said pinion 7. Said roller 9 will now drive the said gear 8 in the direction indicated by the arrow and in its course will approach nearer to the center of the said gear 8, its line of travel being indicated by the dashed curved line 13. The velocity of said gear 8 is accelerated by the roller 9 until said roller has reached the position closest to the center of said gear 8, illustrated by Fig. 3, and afterward its velocity is retarded till the said roller leaves the cam race as shown in Fig. 4, when the gear teeth will come into mesh again. To illustrate the action of the said roller and cam plates upon the velocity of said gear 8, we have shown in Fig. 6 a diagram, the longitudinal lines of which represent a development of one rotation of gear wheel 8 and the cross lines represent degrees of velocity. The heavy line represents the velocity curve of said gear 8 during one rotation. At the edge of the diagram the velocity is normal, being driven by the teeth of the pinion 7 and remains so till near the center of the diagram. Here it curves upward gradually. This occurs when the roller enters the cam race. The velocity increases till the curve reaches the highest point in the center of the diagram and from there on the velocity is retarded till the line drops to the normal velocity line. It will be noted that the velocity is accelerated gradually until the greatest velocity is reached and then retarded gradually till normal velocity is reached corresponding in smoothness to the curve in the velocity line. This smoothness of accelerated velocity is accomplished by the particular angle of the cam race 10. The said cam race must be so positioned that a line drawn centrally through it will form an angle with a radial line of the gear 8 passing through the center of the roller 9 and the said angle will be on the side of said radial line opposite to the direction of travel of the said roller 9. The sprocket wheel 14 is keyed to shaft 6 and is used to drive chain 15, which in turn, drives the endless conveyer chains 16—16 shown in Fig. 1. The operation of our invention is as follows; power is applied to shaft 5 in any suitable manner. In Fig. 1 we have shown the same source of power as that employed in Fig. 1 of the patent application filed Aug. 3, 1912, Serial No. 713,029 for a cracker cutting machine, of which this application is a division. By rotation of shaft 5 pinion 7 drives gear 8 which in turn drives shaft 6 and thereupon sprocket wheel 14 drives the conveyer chains 16 through chain 15 and coöperating mechanism. Bake pans are placed upon said conveyer chains and are conveyed along thereby and as said pans pass a certain point on the machine it is desirable to have the pans jump or skip a short distance at a speed above their normal movement. This is done to keep the biscuits, as they are deposited upon said pans, from falling between the pans or upon their edges. This feature is old and well known in the art and is merely mentioned here to show the utility of our present invention. During the normal travel of the conveyer chains 16—16 the pinion 7 is driving gear 8 by means of their intermeshing teeth but when the conveyer chains take on an accelerated velocity to skip the pans the gear wheel 8 is being driven at a higher velocity by means of the rotating arm 17 and roller 9, as heretofore described.

Having described our invention, what we claim as new and desire to secure by Letters Patent is:—

1. A mechanical movement for a cracker cutting machine composed of a wheel provided with a cam race, a rotating arm carrying a roller which plays in said cam race and thereby imparts accelerated and retarded motion to said wheel; said cam race being so positioned that a radial line on said wheel passing through the center of said roller is angular with the path of said cam race.

2. A mechanical movement for a cracker cutting machine composed of a gear wheel provided with a cam race, a pinion meshing into and normally driving said gear wheel and a rotating arm carrying a roller which plays into said cam race and imparts varied motion to said gear wheel.

DANIEL K. ALLISON.
BRYAN D. PINKNEY.

Witnesses:
F. A. HASSMANN,
WM. HUST.